Nov. 13, 1945.  H. F. MERRIAM  2,389,071
PRODUCTION OF SULPHUR DIOXIDE
Filed April 7, 1943
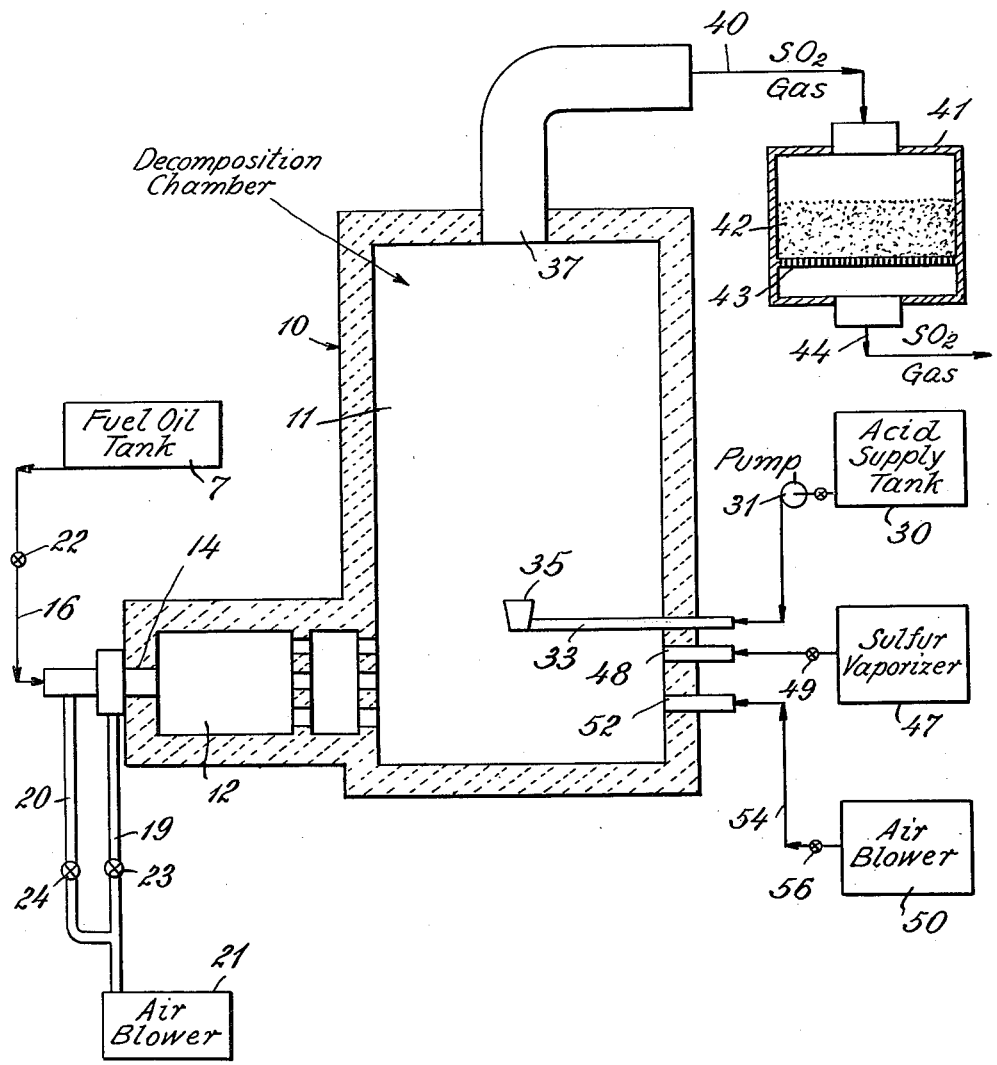
INVENTOR.
Henry F. Merriam
BY Joseph A. Ryan
ATTORNEY Patented Nov. 13, 1945

2,389,071

UNITED STATES PATENT OFFICE 2,389,071

PRODUCTION OF SULPHUR DIOXIDE

Henry F. Merriam, West Orange, N. J., assignor to General Chemical Company, New York, N. Y., a corporation of New York Application April 7, 1943, Serial No. 482,161

9 Claims. (Cl. 23—172)

This invention is directed to manufacture of sulphur dioxide gas suitable for catalytic oxidation to sulphur trioxide gas which may be employed in manufacture of commercial sulphuric acid or oleum. More particularly, the invention relates to production of sulphur dioxide gas from spent or waste sulphuric acids containing organic impurities.

In several industrial processes there are formed large quantities of by-product or spent sulphuric acids which ordinarily run rather high in $H_2SO_4$ and contain organic impurities of hydrocarbonaceous nature in variable but relatively small amounts. Organic impurities of this character, under certain conditions of temperature, act to reduce the $H_2SO_4$ of the acid to $SO_2$ and water. Spent acids of the kind referred to contain organic impurities in quantity less than that needed to reduce the $H_2SO_4$ content of the acid to $SO_2$ and water, and it is to production of commercially satisfactory $SO_2$ gas from this particular type of waste or spent by-product sulphuric acid that the present invention is directed.

It has been proposed in several instances to recover, as sulphuric acid, the sulphur values of impure sulphuric acid containing organic impurities by decomposing such acid by heating to form $SO_2$ gas, purifying the gas, drying, and catalytically oxidizing $SO_2$ to $SO_3$ which is then absorbed to form sulphuric acid. One of the major difficulties encountered in the past, in connection with utilization in the manufacture of commercial sulphuric acid from $SO_2$ gases formed by decomposition of impure sulphuric acids containing organic impurities, has been the problem of attempting to get rid of organic impurities or at least convert the same to a form which does not adversely affect the catalytic oxidation of $SO_2$ to $SO_3$ nor the absorption of such $SO_3$ to produce sulphuric acid commercially satisfactory as to color. According to known procedures, the acid is decomposed at low temperatures of say 300 to 600° F. In such processes, decomposition zone exit gas contains not only $SO_2$ but also a substantial quantity of gaseous or vaporous organic material derived from the organic impurity content of the raw acid. In these instances, it has been necessary to subject such decomposition zone exit gas to special treatments of various kinds to effect conversion of the organic constituents of the $SO_2$ gas to a non-deleterious form. Thus, prior low temperature methods require a purification step in addition to the steps customarily used in the purification of $SO_2$ gas prior to catalysis to form $SO_3$.

Principal objects of this invention are provisions of a process operative to obtain high transformation of the $H_2SO_4$ content of incoming impure acid to $SO_2$; to convert organic impurities in incoming acid to non-deleterious form; and to accomplish these ends simultaneously and in a single stage operation which may be carried out at moderately elevated temperatures which are not high enough to require any special construction of apparatus or to cause apparatus deterioration which is an unavoidable disadvantage of high temperature operation. Further objectives are provision of procedure according to which it is possible to produce strong $SO_2$ gas affording the advantage of material reduction in size of the $SO_2$ gas producing unit and of all subsequent units in the $H_2SO_4$ plant; and to prevent presence of free sulphur in the decomposition zone exit gas, thus avoiding corrosion of apparatus and clogging of subsequent apparatus units and presence of free sulphur in the acid liquors in the system.

The invention, its more particular objects and advantages, may be understood from the following description taken in connection with the accompanying drawing showing diagrammatically apparatus in which a preferred embodiment of the invention may be carried out.

Referring to the drawing, 10 indicates a brickwork furnace providing a cylindrical preferably vertically elongated decomposition or reaction chamber 11. Communicating with the lower end of the reaction chamber is a combustion chamber 12 equipped with a burner 14 connected thru pipe 16 with an oil or other fuel supply tank 7 and by pipes 19 and 20 with an air blower 21, pipes 16, 19 and 20 having control valves 22, 23 and 24. The combustion chamber and the associated burner and accessories may be of any satisfactory design facilitating control of the composition of the hot combustion gas formed and fed into the bottom of chamber 11.

Acid to be utilized as source of $SO_2$ gas is withdrawn from supply tank 30 by pump 31 and injected into the reaction chamber thru a suitable inlet pipe 33 having an upwardly directed spray nozzle 35 on the outlet end. As indicated on the drawing, the nozzle is sufficiently above the bottom of the chamber as to be well within the stream of incoming combustion gas.

The gas-vapor mixture formed in chamber 11 is discharged thru outlet 37 and passes thru conduit 40 into a casing 41 containing a body of filtering material 42 supported by a grille 43. The filtered gas-vapor mixture, now free from deleterious organic impurities, flows thence thru pipe 44 to the head end of any known type of system for cooling, drying, and otherwise conditioning the $SO_2$ gas for conversion to $SO_3$ by the contact process.

Numeral 47 indicates any suitable type of sulphur vaporizer which may be operated to charge sulphur vapor into reaction chamber 11 thru inlet 48, flow of vaporized sulphur into chamber 11 being regulated by valve 49. In certain modifications of the invention, air may be fed into chamber 11 by blower 50 the pressure side of which is connected to air inlet 52 by pipe 54 having a control valve 56.

In the usual practice of the invention, sulphuric acids which may be used as sources of ultimate $SO_2$ gas product are preferably more or less dilute impure acids such as denitrated spent sulphuric acids from the manufacture of nitrated organic compounds. Organic impurities in acids of this type are mostly in the form of ether soluble organic compounds, and under certain temperature conditions function to reduce $H_2SO_4$ of the acids to $SO_2$ and water. Such suitable acids are dark-colored spent sulphuric acids formed as by-products in the manufacture of trinitrotoluene, typical samples of which may analyze 65–93% $H_2SO_4$; 0.02–0.05% iron dissolved as sulphate; water; and contain 0.6–0.02% of ether soluble organic bodies. In denitrated spent acids of this type, the organic impurities, determined as carbon, usually do not exceed 0.2%. (All quantities by weight.) Spent or waste acids of this type are all contaminated with organic impurities of $H_2SO_4$ reducing properties and are also characterized in that the organic impurity content is less than that needed to reduce the $H_2SO_4$ of such acids to $SO_2$ and water. Similar spent or waste acids, from other sources and containing not more organic impurity than is required to reduce the $H_2SO_4$ content to $SO_2$ and water, may be employed in practice of the present process.

In the practice of this invention, the impure acid is sprayed into or otherwise disseminated in the decomposition chamber. The recovery as $SO_2$ of the sulphur constituent of the sulphuric acid charged into the decomposition chamber is based on reduction of the $H_2SO_4$ to $SO_2$ and water rather than by dissociating the $H_2SO_4$ successively to $SO_3$ and $SO_2$ by means of heat alone.

I find that decomposition of the starting acid should be carried out according to certain procedural features which are of interdependent importance. The first of these is relatively thorough dissemination or distribution of the impure acid in the reaction zone. Although satisfactory acid dissemination may be effected in any mechanically suitable way, it is desirable to inject the acid into the reaction chamber in the form of a spray, the type of spray nozzle employed being such as to break up incoming acid into particles as fine as operatively feasible. When working with a spent nitrating acid of the type described, while actual organic impurity content is low, experience obtained in previous attempts to eliminate hydrocarbon impurities from such acids shows that these impurities are refractory and difficult to convert to nondeleterious form. I find that one feature needed to facilitate satisfactory utilization and oxidation of organic impurities is formation in the reaction chamber of a good dispersion or suspension of the liquid acid particles so that the relatively small amount of organic impurities may be well distributed throughout the distillation zone. Whatever the specific manner of acid injection may be, introduction of the acid should be such as to prevent formation in the reaction chamber of pools of liquid. With this feature in view, the spray head may be placed at any convenient location, although it is preferred to direct the acid spray upwardly from a point spaced sufficiently from the bottom of the reaction chamber so that incoming combustion gas stream envelopes the acid spray at its base. Upward injection of acid facilitates increase of the time interval of suspension of a spray particle to such an extent that any particular globule of acid becomes decomposed before it has a chance to drop back onto the bottom of the reaction chamber. Hence the type of spray nozzle, location of the same in the reaction chamber, quantity of acid and pump pressure effecting injection are all chosen so as to thoroughly disseminate the acid particles and maintain such particles in suspension long enough to permit decomposition to take place.

As indicated, the preferred impure acids used in carrying out the invention usually contain much less organic reducing matter than is required to reduce the $H_2SO_4$ of the acid to sulphur dioxide and water. Organic reducing matter content is variable and may run as high as say 3 or 4% by weight (calculated as carbon) of the $H_2SO_4$ content of the acids. To effect $H_2SO_4$ reduction, heat and $H_2SO_4$ reducing material from a source extraneous of the organic reducing material content of the impure acid are supplied to the reaction chamber. Procedure by which waste or spent sulphuric acid is decomposed to sulphur dioxide in accordance with the invention generally comprises disseminating the acid in a reaction zone, introducing into the reaction zone into direct contact with the disseminated acid hot combustion gas, substantially free of carbonaceous material other than CO and $CO_2$, to furnish part or all of the heat requirements, supplying to the zone certain quantities of sulphurous reducing material, the total quantity of reducing material (i. e. the organic reducing material content of incoming acid plus whatever CO and hydrogen there may be in the hot combustion gas, plus extraneous sulphurous reducing material) supplied to the zone preferably being that needed to reduce at least 80% of the $H_2SO_4$ of the acid to $SO_2$ and water, thus forming sulphur dioxide gas, discharging the sulphur dioxide gas from the reaction zone, and maintaining temperatures in the zone such that the temperature of the gas exiting the zone is not less than 900° F. Foregoing features are common to all modifications of the invention.

The invention is further characterized by use in the decomposition zone exit gas of mildly oxidizing conditions, specifically maintenance in such exit gas of a concentration of free oxygen of 0.5% to 1% by volume or a concentration of $SO_3$ of at least 1% by volume.

In one embodiment, in the practice of which it is desired to convert deleterious organic impurities to non-harmful form, prevent the presence in the reduction zone exit gas of free sulphur and avoid resultant apparatus corrosion and clogging of subsequent apparatus units, the total quantity of $H_2SO_4$ reducing material supplied to the decomposition zone is appreciably less than that needed to reduce all of the incoming $H_2SO_4$ to $SO_2$ and water, and the sulphurous reducing material used is in the form of elemental sulphur. In this instance, the reducing agent utilized in decomposition may be derived from three sources: first, the organic reducing matter content of the incoming acid; second, whatever CO and hydrogen may be present in the hot combustion gas; and third, elemental sulphur which may be introduced into the reaction zone as sulphur vapor, as liquid sulphur sprayed into the decomposition chamber, or as solid elemental sulphur mixed with the impure acid fed to the decomposition zone. It will be understood that, at the temperature conditions existing in the decomposition zone, organic reducing matter of incoming acid, sprayed liquid sulphur, or solid sulphur suspended in incoming acid are substantially instantaneously converted to gaseous or vaporous form, and for all practical purposes all reducing material is supplied to the decomposition chamber in gaseous or vaporous condition. The $H_2SO_4$ constituent of incoming acid which is reduced by elemental sulphur is reduced in accordance with the equation 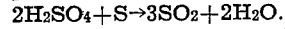
$2H_2SO_4 + S \rightarrow 3SO_2 + 2H_2O$.

The decomposing reaction is endothermic, and reaction temperatures are created by combustion of suitable fuel, e. g. fuel oil. Oil and air are fed to burner 14, and in the presently described modification of operation, valves 22, 23 and 24 are adjusted so as to form preferably a substantially completely combusted hot gas containing substantially no reducing constituents and substantially no free oxygen. While the hot gas need not necessarily be combusted completely, operation of the burner is controlled so that the hot gas as fed into the decomposing zone is substantially free of carbonaceous material other than CO and $CO_2$. Temperatures in the combustion chamber 12 may be of the general order of upwards of 2000° F. Temperatures in the lower end of the decomposing chamber are customarily say 1050–1300° F. Operation of the combustion chamber or supply of reactants to the reaction zone or both are regulated so as to maintain temperatures in the reaction zone such that the temperature of the gas exiting the reaction zone is not less than 900° F. More usual reaction zone exit gas temperatures are about 950–1100° F.

The elemental sulphur needed is fed into chamber 11 thru inlet 48 from vaporizer 47, and it will be understood that in determining the amount of sulphur to be fed into the reaction zone, whatever quantities of CO and hydrogen there may be in the combustion gas are taken into account. In this embodiment of the invention, it is preferred to operate so as to maintain in the $SO_2$ gas discharged from the reaction zone, i. e. in the gas stream in exit pipe 40, $SO_3$ in amount not less than 1% by volume, dry basis. According to this embodiment, it is preferred to use in the reaction zone a total quantity of reducing material such as is required to reduce not more than 95%, and usually 90–95%, of the $H_2SO_4$ content of the incoming acid to $SO_2$ and water.

In decomposition reactions of the type to which the invention relates, i. e. transforming the $H_2SO_4$ constituent to sulphur dioxide by chemical reduction rather than by dissociation by use of heat alone, the difficulties encountered lie in securing good reduction of $H_2SO_4$, in converting organic impurities to non-deleterious form, in making efficient use of reducing material, and in preventing presence of free sulphur in the reaction zone exit gas. Work carried out during development of the invention shows the importance of close control of the free oxygen content of the reaction chamber exit gas. I find that if such free oxygen concentration is permitted to rise above 1% by volume, $H_2SO_4$ reduction falls off markedly, and the objectives of the invention are not attained. For example, in one instance in which about 50% more elemental sulphur than theoretically required was used, where the reaction zone exit gas contained 2.3% free oxygen, only about 60% of the incoming $H_2SO_4$ was reduced to $SO_2$. In the embodiment of the invention now being described, reaction zone exit gas need not necessarily contain any free oxygen and ordinarily contains not more than 0.2% by volume of free oxygen because of the previously described manner of operation of combustion chamber 12. However, the presence of some free oxygen in the reaction zone exit gas is not detrimental, but if present should not be more than 1% by volume, substantially dry basis, e. g. by Orsat analysis.

When operating as described, good reduction of $H_2SO_4$ to $SO_2$ is obtained, presence of free sulphur in the $SO_2$ gas is prevented, and organic impurities are converted to non-deleterious form apparently, at the temperatures prevailing, by the reaction $2H_2SO_4 + C \rightarrow 2SO_2 + CO_2 + 2H_2O$.

A marked advantage of this embodiment of the process is production of highly concentrated $SO_2$ gas. In a representative operation, using a spent acid from the manufacture of trinitro-toluene containing about 92% $H_2SO_4$ and about 0.1% organic impurity calculated as carbon, using elemental sulphur fed in as sulphur vapor as the extraneous reducing agent, a total quantity of reducing material required to reduce about 90% of incoming $H_2SO_4$, hot gases from the combustion of fuel oil as the heating medium, average reaction zone exit temperatures of 1000–1100° F., and controlling production of hot gases of fuel combustion so that such gases contained substantially no reducing constituents and so that the reaction zone exit gas contained about 0.2% free oxygen by volume, about 90% reduction of incoming $H_2SO_4$ was obtained, and there was produced a reaction zone exit gas averaging 27% $SO_2$ and 9.5% $CO_2$ by volume, and containing $SO_3$ in amount more than 1% by volume. The resulting sulphuric acid formed by subsequent catalysis and absorption met commercial requirements as to color. Such high $SO_2$ concentration affords the advantage of making possible use of small apparatus units in the plant, thus substantially reducing capital investment.

Keeping adequate minimum temperature in reaction zone 11 is a matter of operating burner 14 and combustion chamber 12 in accordance with known fuel combustion practice. Maintenance of the described free oxygen concentration in the reaction zone exit gas is relatively simple. Composition of such gas as to oxygen content may be determined by means of standard gas analysis apparatus. If free oxygen content of the exit gas rises outside the indicated limits, it is only necessary to make slight decrease of the amount of air supplied to burner 14.

The sulphur dioxide gas mixture discharged from chamber 11 flows thru conduit 40 and is passed thru a bed 42 of any suitable filtering material such as broken firebrick which functions to remove mechanically entrained solids and to complete removal of any organic material which may be carried in traces by the gas stream. The filtering operation is carried out ordinarily at temperatures in excess of about 800° F. and at these temperatures, the filtering material appears to act as a catalyst to complete conversion of any traces of organic matter present to a non-deleterious form.

In practice of a second embodiment, the total quantity of reducing material (i. e. the organic reducing material content of incoming acid plus any CO and hydrogen which there may be in the hot combustion gas plus extraneous sulphurous reducing material) supplied to the reaction zone is at least equal to, or may be well in excess of, that required to reduce all of the $H_2SO_4$ content of the incoming acid liquor to $SO_2$ and water. However, when employing an equal or excess total amount of reducing material, operation of the decomposition reaction is effected so as to maintain in the $SO_2$ gas discharged from the zone free oxygen in amount not less than 0.5% and not more than 1% by volume. In this situation, the free oxygen content of the reaction zone exit gas should not exceed 1% in order to make efficient use of reducing material and to obtain high transformation of the $H_2SO_4$ content of impure acid to $SO_2$, and on the other hand, free oxygen concentration of the decomposition exit gas should not drop below 0.5% in order to avoid presence of free sulphur in the exit gas and as importantly to insure conversion to non-deleterious form of the organic impurities contained in the incoming acid. Temperature in the decomposition zone and free oxygen concentration in the decomposition zone exit gas may be readily kept as indicated by suitable operation of burner 12. Where the quantity of extraneous sulphur fed into the decomposition zone is such that the total quantity of reducing material supplied thereto is in excess of that required to reduce the $H_2SO_4$ to $SO_2$, it will be only necessary to supply to chamber 11 adequate oxygen to oxidize to $SO_2$ whatever amounts of sulphur are fed into chamber 11 over and above the quantity needed to effect reduction of the $H_2SO_4$ constituent of incoming acid. Additional oxygen needed for such operation may be brought into the reaction zone either as air thru inlet 52, or burner 14 and combustion chamber 12 may be operated to introduce into the bottom of chamber 11 a gas containing enough oxygen to supply the added requirement.

Other sulphurous reducing agents may be used in place of elemental sulphur. For example, $H_2S$ from a source not shown may be introduced into reaction chamber 11 thru inlet 48. In this instance, sulphuric acid is reduced to sulphur dioxide and water in accordance with the equation $3H_2SO_4 + H_2S \rightarrow 4SO_2 + 4H_2O$. When using $H_2S$ as the extraneous reducing agent, the objectives and modes of operation are otherwise the same as in the two embodiments above described. Also, varying combinations of elemental sulphur and $H_2S$ may be used as the extraneous reducing material.

I claim:

1. The method for producing sulphur dioxide by decomposing sulphuric acid containing organic reducing material in amount less than that required to reduce the $H_2SO_4$ content of said acid to $SO_2$ and water which method comprises disseminating said acid in a reaction zone, introducing into the reaction zone into direct contact with the disseminated acid hot combustion gas substantially free of carbonaceous material other than CO and $CO_2$, supplying to said zone reducing material, selected from the group consisting of elemental sulphur and hydrogen sulphide, in amount such that the total quantity of reducing material supplied to said zone is sufficient to reduce at least 80% of the $H_2SO_4$ content of said acid to $SO_2$ and water, thereby forming $SO_2$ gas, discharging $SO_2$ gas from said zone, maintaining temperatures in said zone such that the temperature of the gas exiting said zone is not less than 900° F., and regulating the decomposing reaction so that the $SO_2$ gas discharged from said zone contains oxidizing agent of the group consisting of (a) free oxygen in amount not less than 0.5% and not more than 1% by volume, and (b) $SO_3$ in amount not less than 1% by volume.

2. The method for producing sulphur dioxide by decomposing sulphuric acid containing organic reducing material in amount ranging from none to an amount less than that required to reduce the $H_2SO_4$ content of said acid to $SO_2$ and water which method comprises disseminating said acid in a reaction zone, introducing into the reaction zone into direct contact with the disseminated acid hot combustion gas substantially free of carbonaceous material other than CO and $CO_2$, supplying to said zone reducing material, selected from the group consisting of elemental sulphur and hydrogen sulphide, in amount such that the total quantity of reducing material supplied to said zone is sufficient to reduce at least 80% of the $H_2SO_4$ content of said acid to $SO_2$ and water, thereby forming $SO_2$ gas, discharging $SO_2$ gas from said zone, maintaining temperatures in said zone such that the temperature of the gas exiting said zone is not less than 900° F., and regulating the decomposing reaction so that the $SO_2$ gas discharged from said zone contains oxidizing agent of the group consisting of (a) free oxygen in amount not less than 0.5% and not more than 1% by volume, and (b) $SO_3$ in amount not less than 1% by volume.

3. The method for producing sulphur dioxide by decomposing sulphuric acid containing organic reducing material in amount less than that required to reduce the $H_2SO_4$ content of said acid to $SO_2$ and water which method comprises disseminating said acid in a reaction zone, introducing into the reaction zone into direct contact with the disseminated acid hot combustion gas substantially free of carbonaceous material other than CO and $CO_2$, supplying to said zone elemental sulphur in amount such that the total quantity of reducing material supplied to said zone is sufficient to reduce at least 80% of the $H_2SO_4$ content of said acid to $SO_2$ and water, thereby forming $SO_2$ gas, discharging $SO_2$ gas from said zone, maintaining temperatures in said zone such that the temperature of the gas exiting said zone is not less than 900° F., and regulating the decomposing reaction so that the $SO_2$ gas discharged from said zone contains oxidizing agent of the group consisting of (a) free oxygen in amount not less than 0.5% and not more than 1% by volume, and (b) $SO_3$ in amount not less than 1% by volume.

4. The method for producing sulphur dioxide by decomposing sulphuric acid containing organic reducing material in amount less than that required to reduce the $H_2SO_4$ content of said acid to $SO_2$ and water which method comprises disseminating said acid in a reaction zone, introducing into the reaction zone into direct contact with the disseminated acid hot combustion gas substantially free of carbonaceous material other than CO and $CO_2$, supplying to said zone reducing material, selected from the group consisting of elemental sulphur and hydrogen sulphide, in amount such that the total quantity of reducing material supplied to said zone is at least equal to that required to reduce the $H_2SO_4$ content of said acid to $SO_2$ and water, thereby forming $SO_2$ gas, discharging $SO_2$ gas from said zone, maintaining temperatures in said zone such that the temperature of the gas exiting said zone is not less than 900° F., and regulating the decomposing reaction so that the $SO_2$ gas discharged from said zone contains free oxygen in amount not less than 0.5% and not more than 1% by volume.

5. The method for producing sulphur dioxide by decomposing sulphuric acid containing organic reducing material in amount less than that required to reduce the $H_2SO_4$ content of said acid to $SO_2$ and water which method comprises disseminating said acid in a reaction zone, introducing into the reaction zone into direct contact with the disseminated acid hot combustion gas substantially free of carbonaceous material other than CO and $CO_2$, supplying to said zone elemental sulphur in amount such that the total quantity of reducing material supplied to said zone is at least equal to that required to reduce the $H_2SO_4$ content of said acid to $SO_2$ and water, thereby forming $SO_2$ gas, discharging $SO_2$ gas from said zone, maintaining temperatures in said zone such that the temperature of the gas exiting said zone is not less than 900° F., and regulating the decomposing reaction so that the $SO_2$ gas discharged from said zone contains free oxygen in amount not less than 0.5% and not more than 1% by volume.

6. The method for producing sulphur dioxide by decomposing sulphuric acid containing organic reducing material in amount less than that required to reduce the $H_2SO_4$ content of said acid to $SO_2$ and water which method comprises disseminating said acid in a reaction zone, introducing into the reaction zone into direct contact with the disseminated acid hot combustion gas substantially free of carbonaceous material other than CO and $CO_2$, supplying to said zone reducing material, selected from the group consisting of elemental sulphur and hydrogen sulphide, in amount such that the total quantity of reducing material supplied to said zone is sufficient to reduce at least 80% but less than the total of the $H_2SO_4$ content of said acid to $SO_2$ and water, thereby forming $SO_2$ gas, discharging $SO_2$ gas from said zone, maintaining temperatures in said zone such that the temperature of the gas exiting said zone is not less than 900° F., and regulating the decomposing reaction so as to prevent, in the $SO_2$ gas discharged from said zone, the presence of free oxygen in amount more than 1% by volume.

7. The method for producing sulphur dioxide by decomposing sulphuric acid containing organic reducing material in amount less than that required to reduce the $H_2SO_4$ content of said acid to $SO_2$ and water which method comprises disseminating said acid in a reaction zone, introducing into the reaction zone into direct contact with the disseminated acid hot combustion gas substantially free of carbonaceous material other than CO and $CO_2$, supplying to said zone reducing material, selected from the group consisting of elemental sulphur and hydrogen sulphide, in amount such that the total quantity of reducing material supplied to said zone is sufficient to reduce at least 80% of the $H_2SO_4$ content of said acid to $SO_2$ and water, thereby forming $SO_2$ gas, discharging $SO_2$ gas from said zone, maintaining temperatures in said zone such that the temperature of the gas exiting said zone is not less than 900° F., and regulating the decomposing reaction so that the $SO_2$ gas discharged from said zone contains $SO_3$ in amount not less than 1% by volume.

8. The method for producing sulphur dioxide by decomposing spent sulphuric acid from the manufacture of trinitrotoluene which method comprises disseminating said acid in a reaction zone, introducing into the reaction zone into direct contact with the disseminated acid hot combustion gas substantially free of carbonaceous material other than CO and $CO_2$, supplying to said zone reducing material, selected from the group consisting of elemental sulphur and hydrogen sulphide, in amount such that the total quantity of reducing material supplied to said zone is sufficient to reduce at least 80% but not more than 95% of the $H_2SO_4$ content of said acid to $SO_2$ and water, thereby forming $SO_2$ gas, discharging $SO_2$ gas from said zone, maintaining temperatures in said zone such that the temperature of the gas exiting said zone is not less than 900° F., and regulating the decomposing reaction so that the $SO_2$ gas discharged from said zone contains $SO_3$ in amount not less than 1% by volume.

9. The method for producing sulphur dioxide by decomposing spent sulphuric acid from the manufacture of trinitrotoluene which method comprises disseminating said acid in a reaction zone, introducing into the reaction zone into direct contact wth the disseminated acid hot combustion gas substantially free of carbonaceous material other than CO and $CO_2$, supplying to said zone elemental sulphur in amount such that the total quantity of reducing material supplied to said zone is sufficient to reduce at least 80% but not more than about 95% of the $H_2SO_4$ content of said acid to $SO_2$ and water, thereby forming $SO_2$ gas, discharging $SO_2$ gas from said zone, maintaining temperatures in said zone such that the temperature of the gas exiting said zone is not less than 900° F., and regulating the decomposing reaction so that the $SO_2$ gas discharged from said zone contains $SO_3$ in amount not less than 1% by volume and not more than 1% free oxygen.

HENRY F. MERRIAM.